Jan. 7, 1941.  E. D. BENHAM ET AL  2,228,162
MACHINE FOR PERFORATING PLASTERBOARD
Filed Sept. 28, 1938  2 Sheets-Sheet 1

INVENTORS.
EMMETT D. BENHAM and
JOHN R. ROSENLEAF,
BY
Hood & Hahn.
ATTORNEYS.

Jan. 7, 1941.   E. D. BENHAM ET AL   2,228,162
MACHINE FOR PERFORATING PLASTERBOARD
Filed Sept. 28, 1938   2 Sheets-Sheet 2
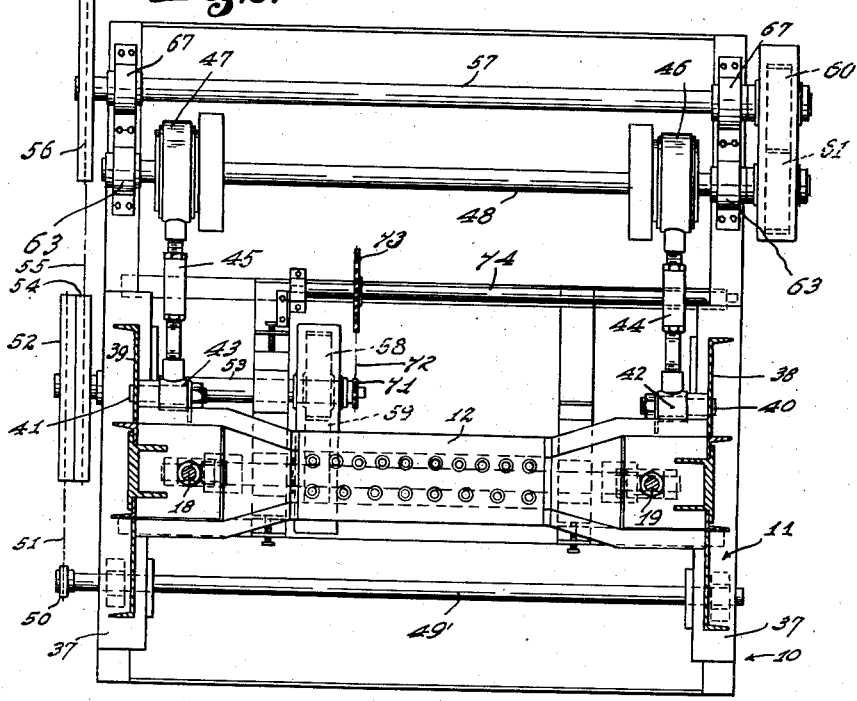
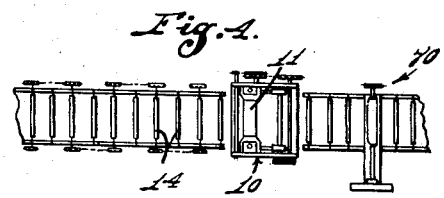
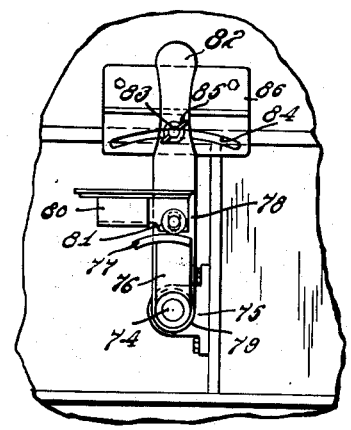
INVENTORS.
EMMETT D. BENHAM and
JOHN R. ROSENLEAF,
BY
Hood & Hahn.
ATTORNEYS.

Patented Jan. 7, 1941

2,228,162

UNITED STATES PATENT OFFICE 2,228,162

MACHINE FOR PERFORATING PLASTERBOARD

Emmett D. Benham and John R. Rosenleaf, Enterprise, Kans., assignors to The J. B. Ehrsam & Sons Manufacturing Company, Enterprise, Kans., a corporation of Kansas Application September 28, 1938, Serial No. 232,032

21 Claims. (Cl. 164—12)

The present application relates to a machine for perforating plasterboard, or the like; and is particularly directed to mechanism for forming perforations in a continuous strip of unset material which emerges continuously from a board making machine.

In recent years, the use of plasterboard as a substitute for wooden or metal lath has come into considerable prominence. It is essential, however, if plaster is to be spread on board of this character, to provide anchoring means; and it has become customary to perforate the board at frequent intervals to provide such anchoring means.

According to the present commercial practice, the plasterboard is formed, by machines, by sandwiching a fluent plastic, such as gypsum plaster, between two fibrous binders, paper being usually used for the binders. The plastic usually takes a preliminary set very promptly after the composite sheet is formed; and then more gradually assumes a permanent and final set. Even after the plastic has assumed its final set, there is considerable excess moisture in the sheet; and this is removed by a drying operation.

The sheet is usually cut into suitable lengths, before the plastic takes its final set, although sometimes the material is cut after it has set. The severed lengths of board are then passed through a drier to expel excess moisture; and after drying, they are stacked into bundles. These bundles of cut lengths are then perforated by drills, usually gang drills, which form the necessary anchoring perforations. Obviously, the drills penetrating through the hard plaster of the boards, form a considerable amount of dust; and some quantities of that dust are retained in the rough walls of the perforations. When the boards are then put in place in a building operation, that dust tends to fall out, to the considerable irritation and discomfort of the operator. Furthermore, it has been found in practice that the perforations so formed in some of the boards are likely to be rough and non uniform; and that the paper binders are likely to be torn in the drilling operation.

It is the primary object of the present invention to provide a machine for perforating plasterboard by punching the board before the plaster takes its final set. We are aware of the fact that it has heretofore been attempted to provide such a machine and that patents have been issued on machines which are alleged to perform such operation. Some of those machines have been put into commercial use, however, and have been found to be commercially entirely impracticable for various reasons.

It will be readily appreciated, however, that if a commercially practicable machine for perforating boards prior to the setting of the plaster can be provided, considerable savings may be effected in the production of plasterboard lath. In the first place, it is obvious that considerably less power will be required to punch through a plastic mass retained between paper binders than is required to drill through a corresponding mass of set plaster. In the second place, the drying operation is materially facilitated, shortened, and cheapened if the perforations are formed in the board before the drying step; since the removal of slugs at frequent intervals throughout the body of the board gives the drying air an enormously larger surface upon which to work. Furthermore, the difficulties with dust, not only in the manufacturing plant but also in the handling of the boards and in the application thereof to building installations, are substantially eliminated. Still further, the holes formed by punching through a plastic mass are found to be considerably more uniform, smoother, and less subject to deformation.

Thus, a further object of the invention is to attain the above advantages through providing a machine for perforating plasterboard in the unset condition by punching. The present application is particularly directed to a machine which will operate to perforate the unset plasterboard before the same is cut into lengths; working upon the unset plasterboard strip as it continuously emerges from the forming machine.

To the accomplishment of the above and related objects, our invention may be embodied in the forms illustrated in the accompanying drawings, attention being called to the fact, however, that the drawings are illustrative only, and that change may be made in the specific construction illustrated and described, so long as the scope of the appended claims is not violated.

Fig. 3 is a plan view thereof, certain parts being shown in horizontal section;

Fig. 4 is a plan, somewhat diagrammatic in character, showing our perforating mechanism and a cut-off machine mounted therewith; and Fig. 5 is a fragmental elevation, upon an enlarged scale, of trip mechanism incorporated in the machine.

Figure 1:
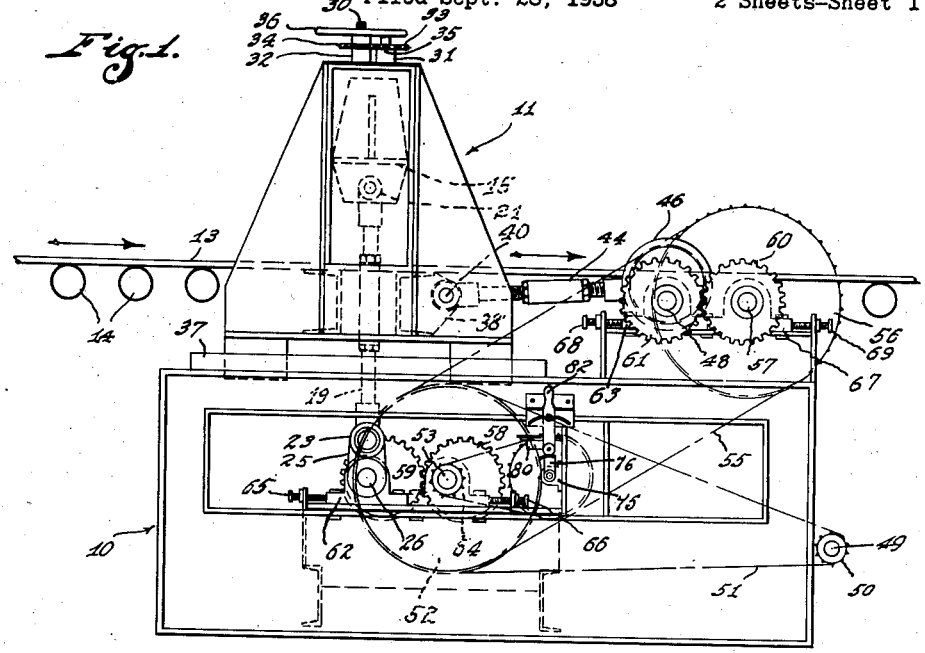
Fig. 1 is a side elevation of a machine constructed in accordance with the present invention.

Referring more particularly to the drawings, it will be seen that the illustrated machine comprises a base indicated generally by the reference numeral 10 upon which is mounted a frame indicated generally by the reference numeral 11 and including a table 12 over which the unset plasterboard 13 is conducted by live roll conveyors 14, or the like; the board moving in the direction of the arrows in Fig. 1.

Figure 2:
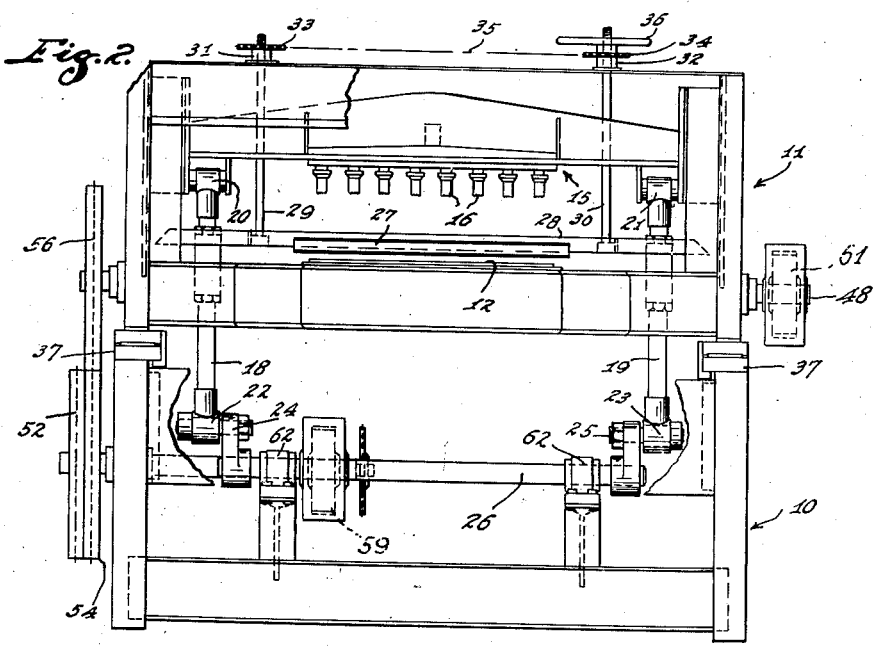
Fig. 2 is an end elevation thereof, parts being broken away for clarity of illustration.

Vertically reciprocably mounted for movement in the frame 11 is a punching head indicated generally by the reference numeral 15 and comprising a gang of punches 16 which may preferably be of the type disclosed in the patent to William J. Ehrsam No. 2,182,744, issued December 5, 1939. Said head is supported upon a connecting rod or pitman 18 and a connecting rod or pitman 19. As is clearly shown in Fig. 2, the upper ends of said connecting rods are journaled, as at 20 and 21, upon trunnions carried by the head 15, while the lower end of said connecting rods are journaled, as at 22 and 23, upon trunnions carried by eccentrics 24 and 25 mounted upon a shaft 26 carried in bearings 62 suitably supported upon the base 10. Obviously rotation of the shaft 26 will cause rectilinear vertical reciprocation of the punching head 15 and the punches 16 carried thereby. The mechanism is so designed that such reciprocation will force the punches 16 to penetrate that section of the plasterboard strip 13 which is currently supported upon the table 12.

A stripper plate 27 is positioned between the punches 16 and the table 12 and is, of course, formed with perforations through which the punches 16 may be projected. Said plate is preferably supported upon a head 28 which, in turn, is supported by rods 29 and 30 threaded at their upper ends for the reception of nuts 31 and 32 supported upon the frame 11 and carrying sprockets 33 and 34 connected by a chain 35; so that rotation of the hand wheel 36 associated with the sprocket 34 will effect rotation of both nuts 31 and 32 to elevate or drop the rods 29 and 30 and the head 28 and stripper plate 27. Thereby, the clearance between the stripper plate 27 and the table 28 may be adjusted to adapt the machine for operation upon various thicknesses of material 13.

The base 10 supports guideways 37 in which the frame 11 is slidably mounted for horizontal movement with respect to said base. Said frame is formed, as is clearly shown in Fig. 3, with projecting flanges 38 and 39. The flange 38 supports a trunnion 40 upon which is journaled one end 42 of a connecting rod or pitman 44; and the flange 39 supports an aligned trunnion 41 upon which is journaled the end 43 of a connecting rod or pitman 45. The opposite ends 46 and 47 of said respective connecting rods are journaled upon identical eccentrics carried by a shaft 48 journaled in bearings 63 suitably mounted on the base 10.

In Fig. 1 we have illustrated a shaft 49 which may be a part of the driving mechanism of the board-forming machine, not shown; and in Fig. 3 we have illustrated a shaft 49' which is journaled in the base 10, and may be driven from any suitable source. The shaft 49 or 49' carries a sprocket 50 which drives, through a chain 51, a sprocket 52 mounted upon a shaft 53 journaled in bearings 64 suitably mounted upon the base 10. Said bearings 64 are preferably positioned adjacent the bearings 62, are mounted for sliding movement on the base 10; and set screws 65 and 66 are provided for holding the bearings 62 and 64 together for simultaneously moving said bearings.

The shaft 53 likewise carries a sprocket 54 which drives, through a chain 55, a sprocket 56 mounted upon a shaft 57 journaled in bearings 67 supported on the frame 10; and said bearings 67 are mounted in juxtaposition to the bearings 63, and screws 68 and 69 are associated with said bearings 63 and 67 to hold the same together, and to shift the same simultaneously with respect to the base 10.

The shaft 53 carries a gear 58 meshing with a gear 59 mounted on the shaft 26, whereby said shaft 26 is driven. Similarly, the shaft 57 carries a gear 60 meshing with a gear 61 carried on the shaft 48, whereby said shaft 48 is driven. It will thus be seen that the drive trains for the shafts 26 and 48 are actuated from a single source of power so that, as the shaft 26 is driven to reciprocate the punch head 15, the shaft 48 is likewise driven to reciprocate the frame 11 horizontally.

The machine of the present application is positioned in the standard conveyor line associated with a board-forming machine in advance of the cut-off machine indicated generally by the reference numeral 70, and is preferably so located that the section of the board 13 which is supported upon the table 12 will have attained a preliminary set. The drive train for the shafts 26 and 48 is so coordinated that, as the punches 16 contact the section of the board supported upon the table 12, the frame 11 will be moving toward the right, as viewed in Fig. 1, at exactly the speed of the advancing board strip 13; and that such movement of the frame toward the right at that speed will be continued until the punches 16 have penetrated the board and have been withdrawn from engagement with the board. As the punches 16 move upwardly after withdrawal from the board, the movement of the frame 11 toward the right will be arrested and the frame 11 will be returned, by movement toward the left, to starting position so that, as the punches again descend into contact with a fresh section of the board, the frame can again begin to move toward the right at the speed of the advancing board strip.

Preferably, the gears 58 and 59 and the gears 60 and 61 are eccentric gears so that both the punch head 15 and the frame 11 will be moved at cyclically variable speeds.

As is clearly shown in Fig. 3, the shaft 53 carries a sprocket 71 which, through a chain 72, drives a much larger sprocket 73 carried upon shaft 74 suitably journaled in the machine frame. As is more particularly shown in Figs. 1 and 5, one end of the shaft 74 is supported in a bearing 75 carried by the machine frame. Outboard beyond the bearing 75, the shaft 74 carries a short lever 76 which terminates in an actuator cam 77.

Adjacent the lever 76 is positioned an arm 78 which, as is shown in Fig. 5, has its lower end 79 loosely journaled upon the shaft 74. Alternatively, the lower end of the arm 78 may be journaled upon a stationary element, but coaxial with the shaft 74.

Said arm 78 carries a switch assembly, illustrated more or less diagrammatically by the reference numeral 80. Said switch mechanism comprises a pair of cooperative, normally separated contact elements so arranged that upward movement of the roller 81 will cause said contact elements to be engaged.

The switch mechanism 80 is connected in a circuit which controls a cut-off machine indicated generally by the reference numeral 70 in Fig. 4. Said cut-off machine is of standard construction, and therefore is not illustrated in detail. The arrangement is such that closure of the contact elements of the switch mechanism 80 will cause a single actuation of the cut-off machine 70 to sever the advancing strip of plasterboard.

An advantageous arrangement of perforations in plaster lath contemplates the provision of a transverse row or series of perforations in each four inches of length of the lath. In the illustrated mechanism, the punches 16 are arranged on the punching head 15 in two series spaced four inches apart; and the punching mechanism is so timed as to engage the advancing strip of board once in every eight inches of movement of the strip.

One advantageous arrangement of the entire illustrated mechanism will provide for cutting the board into four foot lengths, the cut-off knife to strike the board midway between two series of perforations. Therefore, the sprockets 71 and 73 are so proportioned that the shaft 74 makes one revolution upon six revolutions of the shaft 53.

Obviously, in the absence of adjusting means, it would be quite possible for the cut-off machine to get out of step with the perforating mechanism. To accomplish that adjustment, the arm 78 is movable through a limited arc about the axis of the shaft 74. The upper end of said arm 78 is formed as a handle 82 and carries a bolt 83 projecting through an arcuate slot 84 in a plate 86 suitably mounted upon the machine frame. A wing nut 85 is threaded upon the bolt 83 to clamp the arm 78 in any desired adjusted position.

We claim as our invention:

1. Mechanism for perforating plasterboard of substantial thickness comprising a table, means for continuously advancing a continuous sheet of plasterboard across said table, a vertically operating punch, means for reciprocating said punch to force the same through said board, and non-yielding means for moving said table and punch at the same speed with said board during movement of said punch through the entire thickness of said board and retraction of said punch therefrom.

2. Mechanism for perforating an unset continuous strip of plasterboard or the like, of substantial thickness, comprising a frame a table carried by said frame, a punch cooperatively associated with said table and carried by said frame, means for continuously advancing said strip across said table, means for reciprocating said punch perpendicularly with respect to said table to penetrate said strip and to retract said punch therefrom, and non-yielding means for reciprocating said frame on the line of movement of said strip to move said frame with said board and at the same speed therewith throughout penetration and retraction movement of said punch.

3. In combination, punching mechanism including a punch, mechanism for continuously advancing continuously-formed plasterboard or the like of substantial thickness past said punching mechanism, means for reciprocating said punch to penetrate such plasterboard intermittently and to retract the punch therefrom and non-yielding means operable to prevent movement of said plasterboard with respect to said punching mechanism in the line of feed of said plasterboard throughout penetration and retraction movement of said punch.

4. The combination with means for continuously producing plasterboard or the like in a continuous strip of substantial thickness and means for continuously advancing such strip, of a table disposed in the path of such strip and adapted to support a portion thereof, a punch associated with said table and mounted for rectilinear movement with respect thereto to penetrate that section of said strip supported on said table, means for reciprocating said punch to effect such rectilinear movement, and simultaneously operating non-yielding means for intermittently shifting said table and punch in the direction of movement of said strip to move at the same speed with said strip during engagement of said punch with said strip.

5. In combination, a base, a frame slidably mounted on said base, a punch reciprocably mounted in said frame, a shaft journaled on said base, an eccentric on said shaft, a pitman connecting said eccentric with said frame, means for driving said shaft, a second shaft journaled on said base, a second eccentric on said shaft, a second pitman connecting said second eccentric with said punch, and means for driving said second shaft.

6. In combination, a base, a frame slidably mounted on said base, a punch reciprocably mounted in said frame, a shaft journaled on said base, an eccentric on said shaft, a pitman connecting said eccentric with said frame, means for driving said shaft, a second shaft journaled on said base, a second eccentric on said shaft, a second pitman connecting said second eccentric with said punch, and means for driving said second shaft in synchronism with said first shaft.

7. In combination, a base, a frame slidably mounted on said base, a punch reciprocably mounted in said frame, a shaft journaled on said base, an eccentric on said shaft, a pitman connecting said eccentric with said frame, means for driving said shaft at cyclically varying speeds, a second shaft journaled on said base, a second eccentric on said shaft, a second pitman connecting said second eccentric with said punch, and means for driving said second shaft at cyclically varying speeds.

8. In combination, a base, a frame slidably mounted on said base, a punch reciprocably mounted in said frame, a shaft journaled on said base, an eccentric on said shaft, a pitman connecting said eccentric with said frame, eccentric-gear means for driving said shaft, a second shaft journaled on said base, a second eccentric on said shaft, a second pitman connecting said second eccentric with said punch, and eccentric-gear means for driving said second shaft.

9. In combination, a base, a frame slidably mounted on said base, a punch reciprocably mounted in said frame, a shaft journaled on said base, an eccentric on said shaft, a pitman connecting said eccentric with said frame, eccentric-gear means for driving said shaft at cyclically varying speeds to reciprocate said frame on said base in the line of movement of material to be perforated, a second shaft journaled on said base, a second eccentric on said shaft, a second pitman connecting said second eccentric with said punch, and eccentric-gear means for driving said second shaft at cyclically varying speeds coordinated with the frame-shifting means to engage said punch with material to be perforated only during periods when the frame is synchronized with such material.

10. Mechanism for producing perforated plaster lath in predetermined lengths, comprising punch mechanism operating periodically to perforate an advancing strip of plasterboard, a cut-off machine arranged to receive the board leaving such punching mechanism, and means actuated periodically by the operation of said punching mechanism to operate said cut-off machine to sever the advancing strip.

11. In combination, means for continuously advancing a continuous strip of plasterboard or the like, a punching mechanism positioned in the path of the advancing strip, a cut-off machine positioned in the path of the advancing strip beyond said punching mechanism, means for driving said punching mechanism to perforate the strip at predetermined intervals, and means actuated by said last-named means for controlling operation of said cut-off machine.

12. In combination, means for continuously advancing a continuous strip of plasterboard or the like, a punching mechanism positioned in the path of the advancing strip, a cut-off machine positioned in the path of the advancing strip beyond said punching mechanism, means for driving said punching mechanism to perforate the strip at predetermined intervals, electrically-actuated means controlling operation of said cut-off machine, a shaft driven by said punching-mechanism-driving means, and switch means dominating said electrically-actuated means, said shaft being operative, upon rotation, to actuate said switch.

13. In combination, means for continuously advancing a continuous strip of plasterboard or the like, a punching mechanism positioned in the path of the advancing strip, a cut-off machine positioned in the path of the advancing strip beyond said punching mechanism, means for driving said punching mechanism to perforate the strip at predetermined intervals, electrically-actuated means controlling operation of said cut-off machine, a switch dominating said electrically-actuated means, a shaft driven by said punching-mechanism-driving means, an element adjustable about the axis of said shaft and carrying said switch, and cam means carried by said shaft and operable, upon rotation of said shaft, to actuate said switch.

14. In combination, a base, a frame slidably mounted on said base, a head reciprocably mounted in said frame, a shaft journaled on said base, an eccentric on said shaft, a pitman connecting said eccentric with said frame, means for driving said shaft, a second shaft journaled on said base, a second eccentric on said shaft, a second pitman connecting said second eccentric with said head, shearing means carried by said head, and means for driving said second shaft.

15. In combination, a base, a frame slidably mounted on said base, shearing means reciprocably mounted in said frame, a shaft journaled on said base, an eccentric on said shaft, a pitman connecting said eccentric with said frame, means for driving said shaft at cyclically varying speeds, a second shaft journaled on said base, a second eccentric on said shaft, a second pitman connecting said second eccentric with said shearing means, and means for driving said second shaft at cyclically varying speeds.

16. In combination, a base, a frame slidably mounted on said base, shearing means reciprocably mounted in said frame, a shaft journaled on said base, an eccentric on said shaft, a pitman connecting said eccentric with said frame, eccentric-gear means for driving said shaft, a second shaft journaled on said base, a second eccentric on said shaft, a second pitman connecting said second eccentric with said shearing means, and eccentric-gear means for driving said second shaft.

17. In combination, a base, a frame slidably mounted on said base, shearing means reciprocably mounted in said frame, a shaft journaled on said base, an eccentric on said shaft, a pitman connecting said eccentric with said frame, eccentric-gear means for driving said shaft at cyclically varying speeds to reciprocate said frame on said base in the line of movement of material to be sheared, a second shaft journaled on said base, a second eccentric on said shaft, a second pitman connecting said second eccentric with said shearing means, and eccentric-gear means for driving said second shaft at cyclically varying speeds coordinated with the frame-shifting means to engage said shearing means with material to be sheared only during periods when the frame is synchronized with such material.

18. The combination with means for continuously producing plasterboard or the like in a continuous strip of substantial thickness and means for continuously advancing such strip, of a head positioned for cooperation with such strip and mounted for rectilinear movement in a plane substantially perpendicular to the plane of movement of such strip, means for reciprocating such head to effect such rectiliner movement, simultaneously operating means for intermittently shifting said head in the direction of movement of said strip at the same speed with said strip, and board-penetrating means carried by said head and engageable with said strip to penetrate the entire thickness of said board and be retracted therefrom only during such movement of said head at the same speed with such strip.

19. The combination with means for continuously producing plasterboard or the like in a continuous strip and means for continuously advancing such strip, of a base, a frame slidably mounted on said base for movement in the plane of movement of said strip, a head reciprocably mounted in said frame for movement in a direction substantially perpendicular to the movement of said strip, board-penetrating means carried by said head, a shaft journaled on said base, an eccentric on said shaft, a pitman connecting said eccentric with said frame, eccentric-gear means for driving said shaft at cyclically varying speeds to reciprocate said frame on said base in the plane of movement of said strip, a second shaft journaled on said base, a second eccentric on said shaft, a second pitman connecting said eccentric with said head, eccentric-gear means for driving said second shaft at cyclically varying speeds coordinated with the frame shifting means to engage said board-penetrating means with such strip only during periods when the frame is synchronized with such strip.

20. Mechanism for producing perforated plaster lath in predetermined lengths, comprising a punch operating periodically to perforate an advancing strip of plasterboard, cut-off mechanism positioned beyond said punch, and means actuated periodically by the operation of said punch to operate said cut-off mechanism to sever the advancing strip.

21. Mechanism for producing perforated plaster lath in predetermined lengths, comprising punch mechanism operating periodically to perforate an advancing strip of plasterboard, a severing knife, and means actuated periodically by the operation of said punching mechanism to operate said knife to sever the advancing strip.

JOHN R. ROSENLEAF.
EMMETT D. BENHAM.